United States Patent
Kwatra et al.

(10) Patent No.: US 11,736,619 B2
(45) Date of Patent: Aug. 22, 2023

(54) AUTOMATED INDICATION OF URGENCY USING INTERNET OF THINGS (IOT) DATA

(71) Applicant: INTERNATIONAL BUSINESS MACHINES CORPORATION, Armonk, NY (US)

(72) Inventors: Shikhar Kwatra, San Jose, CA (US); Peeyush Jaiswal, Boca Raton, FL (US); Raghuveer Prasad Nagar, Kota (IN); Priyansh Jaiswal, Boca Raton, FL (US); Reji Jose, Bangalore (IN); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

(21) Appl. No.: 17/247,213

(22) Filed: Dec. 3, 2020

(65) Prior Publication Data
US 2022/0182494 A1    Jun. 9, 2022

(51) Int. Cl.
*H04M 7/00* (2006.01)
*H04M 3/22* (2006.01)
*G16Y 40/30* (2020.01)

(52) U.S. Cl.
CPC ............. *H04M 7/006* (2013.01); *G16Y 40/30* (2020.01); *H04M 3/2281* (2013.01)

(58) Field of Classification Search
CPC ..... H04M 7/006; H04M 3/2281; G16Y 40/30
USPC ......................................................... 370/259
See application file for complete search history.

(56) References Cited

U.S. PATENT DOCUMENTS

| 5,825,867 A | 10/1998 | Epler |
| 6,653,930 B1 | 11/2003 | Bonomo |
| 7,571,101 B2 | 8/2009 | Humble |
| 8,295,446 B1 | 10/2012 | Apple |
| 8,762,143 B2 | 6/2014 | Gilbert |
| 8,934,877 B2 * | 1/2015 | Toksvig ................ H04W 76/50 455/414.3 |
| 9,262,612 B2 | 2/2016 | Cheyer |

(Continued)

FOREIGN PATENT DOCUMENTS

| CN | 113096358 A | * | 7/2021 |
| KR | 20200139603 A | * | 12/2020 |
| WO | WO-2017124116 A1 | * | 7/2017 |

OTHER PUBLICATIONS

Anonymous, Intelligent Virtual Assistant Market Size, Share & Trends Analysis Report By Product (Chatbot, Smart Speakers), By Technology, By Application (BFSI, Healthcare, Education), By Region, And Segment Forecasts, 2020-2027, Industry Report, Apr. 2020 [accessed on Jul. 7, 2020], 7 pages, Retrieved from the Internet: <URL: https://www.grandviewresearch.com/industry-analysis/intelligent-virtual-assistant-industry>.

(Continued)

*Primary Examiner* — Ahmad F. Matar
*Assistant Examiner* — Jirapon Tulop
(74) *Attorney, Agent, or Firm* — Alexis N. Hatzis

(57) ABSTRACT

A method, computer system, and a computer program product for automated urgency detection is provided. The present invention may include capturing at least one caller parameter. The present invention may include determining whether an incoming call is urgent. The present invention may include conveying a determined urgency to a receiver of the incoming call.

20 Claims, 5 Drawing Sheets

(56) References Cited

U.S. PATENT DOCUMENTS

| | | |
|---|---|---|
| 9,336,730 B2 | 5/2016 | Inoue |
| 9,502,029 B1 | 11/2016 | Bell |
| 2002/0002460 A1 | 1/2002 | Petrushin |
| 2005/0259802 A1 | 11/2005 | Gray |
| 2007/0248221 A1 | 10/2007 | Chatterjee |
| 2008/0159514 A1 | 7/2008 | Phillips |
| 2016/0249319 A1* | 8/2016 | Dotan-Cohen ... H04M 1/72454 |
| 2018/0136912 A1* | 5/2018 | Venkataramani ........ G06N 3/04 |

OTHER PUBLICATIONS

Lefter, et al., "Automatic Stress Detection in Emergency (Telephone) Calls," International Journal of Intelligent Defence Support Systems, Jan. 2011, 20 pages, vol. x, No. x, xxx, Inderscience Enterprises, Ltd., DOI: 10.1504/IJIDSS.2011.039547, Retrieved from the Internet: <URL: https://www.researchgate.net/publication/254903992_Automatic_stress_detection_in_emergency_telephone_calls>.

Mell, et al., "The NIST Definition of Cloud Computing", National Institute of Standards and Technology, Special Publication 800-145, Sep. 2011, 7 pages.

Zhou, et al., "Nonlinear Feature Based Classification of Speech Under Stress," IEEE Transactions on Speech and Audio Processing, Mar. 2001 [accessed on May 22, 2020], pp. 201-216, vol. 9, No. 3, IEEE, DOI: 10.1109/89.905995, Retrieved from the Internet: <URL: https://ieeexplore.ieee.org/document/905995>.

* cited by examiner

US 11,736,619 B2

AUTOMATED INDICATION OF URGENCY USING INTERNET OF THINGS (IOT) DATA

BACKGROUND

The present invention relates generally to the field of computing, and more particularly to telephone communications.

A receiver of a telephone call may be alerted as to the caller's identity (e.g., including a name and/or a telephone number) but may be unable to detect an urgency and/or a subject of the caller's call. Caller identification systems may provide information about the "who" (e.g., who the caller is) without providing information about the "why" (e.g., why the caller is calling).

SUMMARY

Embodiments of the present invention disclose a method, computer system, and a computer program product for automated urgency detection. The present invention may include capturing at least one caller parameter. The present invention may include determining whether an incoming call is urgent. The present invention may include conveying a determined urgency to a receiver of the incoming call.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
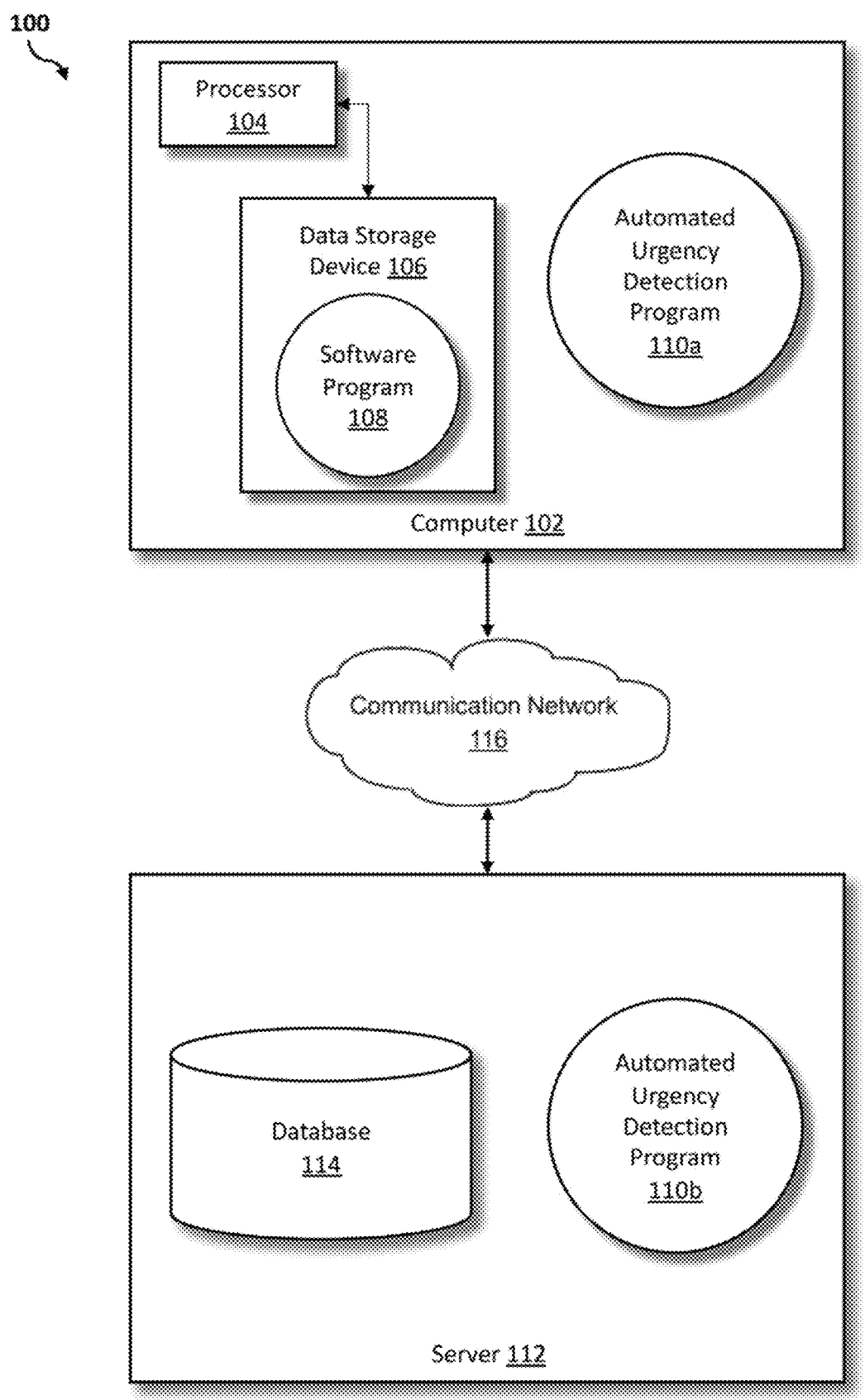
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for automated urgency detection. As such, the present embodiment has the capacity to improve the technical field of telephone communications by automatically deriving and indicating an urgency and/or an importance of a caller's call (i.e., an incoming call) so that a receiver of the call may take appropriate action and efficiently handle the incoming call. More specifically, the present invention may include capturing at least one caller parameter. The present invention may include determining whether an incoming call is urgent. The present invention may include conveying a determined urgency to a receiver of the incoming call.

As described previously, a receiver of a telephone call may be alerted as to the caller's identity (e.g., including a name and/or a telephone number) but may be unable to detect an urgency and/or a subject of the caller's call. Caller identification systems may provide information about the "who" (e.g., who the caller is) without providing information about the "why" (e.g., why the caller is calling).

Therefore, it may be advantageous to, among other things, automatically derive and indicate an urgency and/or an importance of a caller's call (i.e., an incoming call) so that a receiver of the call may take appropriate action and efficiently handle the incoming call.

According to at least one embodiment, the present invention may derive a context and/or an urgency of an incoming call and may display the derived context and/or urgency to a receiver of the call.

According to at least one embodiment, the present invention may enable a receiver of an incoming call to delay answering the incoming call based on an indication that the incoming call is not urgent. An option to delay an incoming call may include delaying the call to a specified time based on a determined context and/or urgency in correlation with a receiver's (i.e., a user's) pending tasks.

According to at least one embodiment, the present invention may include deriving a context and/or an urgency of an incoming call, displaying the context and/or urgency for a user (i.e., a receiver of the incoming call), and conditionally recommending to the user a time to delay the incoming call to.

According to at least one embodiment, the present invention may utilize at least one connected database (e.g., including crowdsourced data evidencing emergencies and/or urgent events) to determine a user context.

According to at least one embodiment, the present invention may be used by emergency call centers, which may enable incoming calls based on an availability of call center personnel. A threshold may be configured, for example, based on bandwidth of call center personnel, to enable incoming calls to come through. The availability of call center personnel may be monitored, and the threshold may be modified accordingly to enable more or fewer incoming calls (e.g., based on an availability of call center personnel).

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an automated urgency detection program 110a. The networked computer environment 100 may also include a server 112 that is enabled to run an automated urgency detection program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the automated urgency detection program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the automated urgency detection program 110a, 110b (respectively) to automatically derive and indicate an urgency and/or an importance of a caller's call (i.e., an incoming call) so that a receiver of the call may take appropriate action and efficiently handle the incoming call. The automated urgency detection method is explained in more detail below with respect to FIG. 2.

Figure 2:
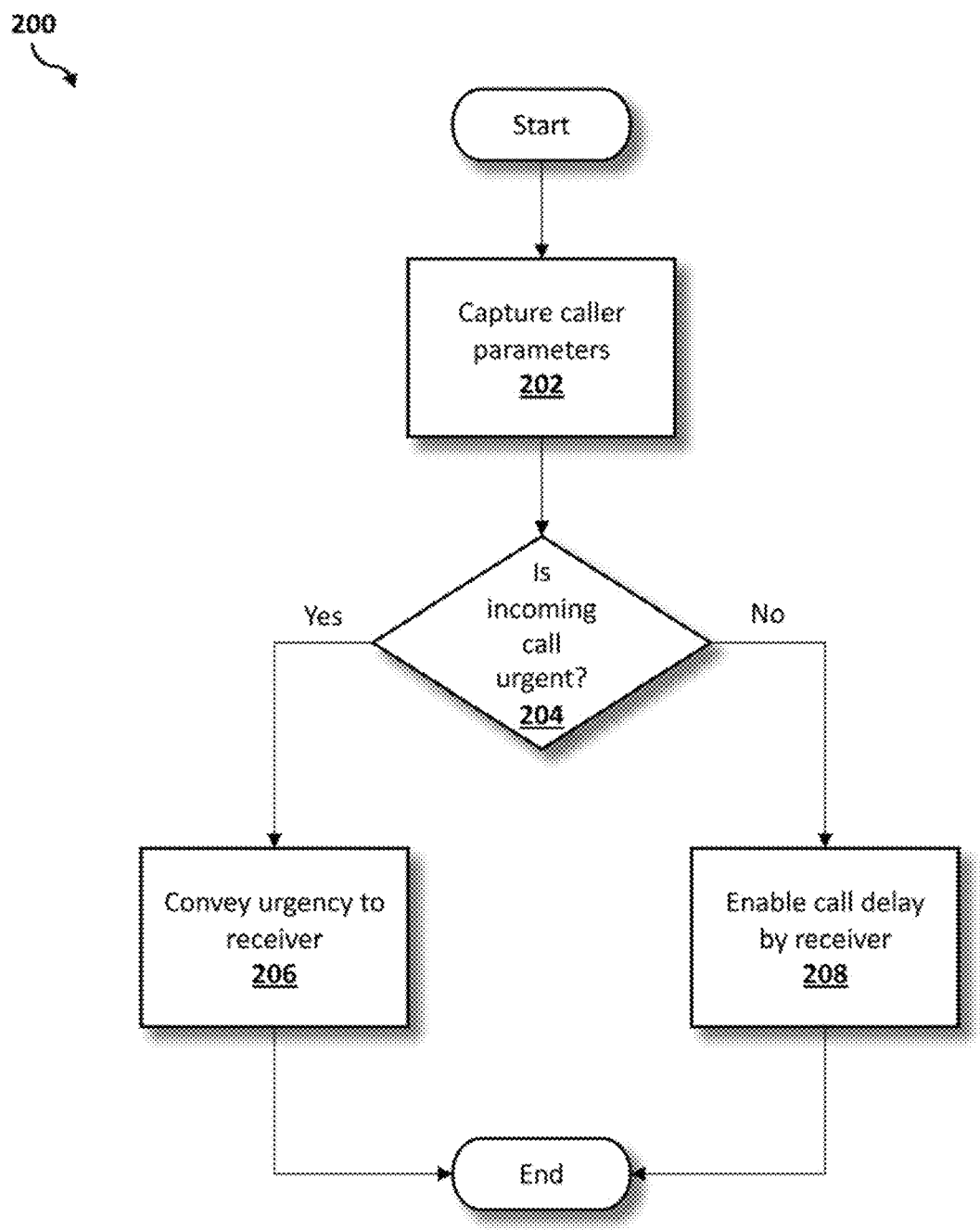
FIG. 2 is an operational flowchart illustrating a process for automated urgency detection according to at least one embodiment.

Referring now to FIG. 2, an operational flowchart illustrating the exemplary automated urgency detection process 200 used by the automated urgency detection program 110a and 110b according to at least one embodiment is depicted.

At 202, caller parameters are captured. An urgency with which a caller is calling may be determined using data from one or more connected Internet of Things (IoT) devices. IoT devices (e.g., smart devices, wearable devices) may be used to capture at least one caller parameter, including a vital parameter (e.g., biometric parameter, biometric signal), of the caller. Vital parameters may include blood pressure and pulse, among other things, and may assist the automated urgency detection program 110a, 110b in determining an urgency and/or a stress level under which the call is being made.

Vital parameters may be recorded from the caller and may be stored in a database (e.g., a cloud database). Current vital parameters of the caller may be compared to past vital parameters so that aberrations (e.g., departures from the caller's norm) may be identified.

Caller parameters may also include raw speech stream data which may be collected from a speech streaming device and passed through a speech to text processor such as IBM's Watson™ (Watson and all Watson-based trademarks are trademarks or registered trademarks of International Business Machines Corporation in the United States, and/or other countries) speech to text so that the content may be analyzed with natural language processing (NLP) algorithms. NLP algorithms such as Watson™ tone analyzer (e.g., to dynamically determine a caller's tone of voice) and sentiment analysis (e.g., to dynamically determine whether a user is temperamental, angry, scared, sad, or happy, among other things) application programming interfaces (API's) as well as Watson™ natural language classifier (e.g., to gather speech content and keyword indicator data) may be used.

From the raw speech stream data, the automated urgency detection program 110a, 110b may identify a caller's tone of voice as well as any aberration in the caller's tone of voice. An aberration in the caller's tone of voice may be identified based on background noise of the caller both before and/or during a call (e.g., by detecting a variation in a caller's tone of voice).

From the raw speech stream data, the automated urgency detection program 110a, 110b may also identify a topic and/or a subject of a call. Capturing the conversations before and/or during the call may help determine a context in which the call is being made. Watson™ Conversation Service may be used to record a caller's conversation(s) and to analyze the recorded content. A topic and/or subject for which the call is being made may also be identified based on an explicit announcement of the subject and/or topic by the caller.

Watson™ Conversation Service may combine natural language understanding (NLU), machine learning and integrated dialog tools to create interference among applications and users. Watson™ Conversation Service may combine a number of cognitive technologies to easily simulate a more human-like conversational interface and may be a useful tool for training chatbots.

Topical information may be identified using contextual analysis via latent Dirichlet allocation (LDA), a generative statistical model in natural language processing (NLP) that may enable sets of observations to be mapped to dynamic topics when the language patterns are similar. LDA may be a method which enables the identification of topics in speech data and which maps documents to the identified topics. Here, LDA may be used to group caller parameters and use them accordingly.

Caller parameters may also include a geographic location (e.g., a temporal metric) of the caller, based on global positioning system (GPS) information of the caller's device, which may assist in determining a severity of the caller's call (e.g., if the caller's location is determined to be at a local hospital or from a vehicle that is traveling towards a hospital, then the urgency and/or severity of the call may be increased).

At 204, the automated urgency detection program 110a, 110b determines whether an incoming call (i.e., a call) is urgent. As described previously with respect to step 202 above, caller parameters may be used to determine whether aberrations (e.g., identifying departures from the caller's norm) may be identified. An aberration (e.g., a departure from the caller's norm) may be identified using a DLNN model (e.g., to determine an urgency of the caller's call and/or to make a prediction). A DLNN model may be used here to predict an urgency of a call given a set of user parameters. The DLNN model may be a single variable used to determine the urgency of a call.

Generally, a DLNN model may require a set of user-defined variables as input and may make a prediction using the user-defined variables. An implementer of the method may determine which factors to consider in determining the urgency of a call. As more relevant input variables are fed into the DLNN model, the model may make more accurate predictions. Here, for example, a hospital location may be fed into the DLNN model (e.g., as a user parameter) to be used as a key factor in determining the urgency of a call. Other factors may include highway location, a time of day (e.g., middle of the night), and identifying the caller as a loved one. When these factors are used together as input to the DLNN model, the DLNN model may detect whether the inputted features reveal a departure from the caller's norm (e.g., from past factors gathered surrounding the user) and an accurate prediction for urgency of a call may be made.

An urgency of a caller's call may be further categorized based on severity with varying risk thresholds. Absolute severity may be defined as severity based on at least one predefined benchmark for the parameters being considered. For example, absolute severity may be triggered when a caller's pulse is 30% faster than normal, and the caller's tone of voice indicates that the caller is highly emotional. Absolute severity may not be triggered if the caller's pulse is within a 5% variation of the caller's normal pulse and the caller's tone indicates that the caller is speaking normally (e.g., as determined by sensors on connected IoT devices).

A relative severity may be determined based on the caller's parameters in the same or similar circumstances in the past. For example, if the receiver of the call is a doctor, a severity scale may be defined based on a history of calls received by the doctor. The relative severity may be determined based on a current context and/or circumstance of the caller. Historical pattern(s) and/or reaction(s) may be analyzed by feeding in a Bi-long short term memory (LSTM) model merged recurrent convolutional neural network (R-CNN) machine learning module running a cloud database in order to record a context and to perform reasoning hops for fetching the required information and making a prediction on severity, given the context.

A LSTM-RNN model may take into account multi-variate time series data (e.g., a series of data points indexed in time order which may have been taken at successive, equally spaced intervals or points in time). The time series data may be time series data about a caller, including any caller parameters. These categorical feature variables may be converted into numerical feature vectors by encoding (e.g., by label encoding or one-hot encoding where categorical feature variables may be converted into a numerical form which may be usable by the machine learning algorithm). The numerical feature vectors may be fed into the LSTM-RNN architecture.

The numerical feature vectors may enable the LSTM-RNN model to learn any probable parameter of a call, if any, and to perform attention detection together with an autoencoder (e.g., an encoder-decoder architecture for recurrent neural networks may be used for sequence-to-sequence prediction problems). Attention detection may be a mechanism and/or a layer in a deep learning model that addresses a limitation of the encoder-decoder architecture on long sequences of data and may use the skill of the LSTM-RNN model on sequence-to-sequence prediction problems.

If, at 204, the automated urgency detection program 110*a*, 110*b* determined that the incoming call (i.e., the call) is urgent, then at 206, an urgency of the call is conveyed to a receiver of the call.

While the call is being made, an analytics engine (e.g., which includes the algorithms described previously with respect to step 204 above) may determine an urgency and/or subject of the call. The determined urgency and/or subject of the call may be conveyed to a receiver of the call by displaying the information on the receiver's telephone screen and/or other connected device in addition to the caller's name and/or phone number. A connected device may include a mobile device, a laptop, and/or a wearable device, among other things.

The receiver of the call may be enabled to respond to the incoming call by ignoring, answering, delaying, and or sending a responsive text message to the caller. The receiver's response may be fed back into the DLNN module in order to recalibrate a derived urgency and/or priority of the caller's call (e.g., to be used as further training for the machine learning model).

According to at least one alternate embodiment, the automated urgency detection program 110*a*, 110*b* may be configured to display all gathered information on the receiver's telephone screen and/or other connected device or to extract the context (e.g., the main point) of the caller's call to display on the receiver's device(s).

According to at least one other alternate embodiment, the automated urgency detection program 110*a*, 110*b* compares a current task performed by a given user with a context of the caller's call in order to determine a comparative risk score. The comparative risk score may predict an optimal time to take the caller's call based on organizing the tasks in a prioritized fashion and displaying the recommended prioritization to the receiver of the call. Further, based on the reinforcement learning module, the automated urgency detection program 110*a*, 110*b* may identify whether the receiver of the call took a similar call based on a past similar recommendation of the automated urgency detection program 110*a*, 110*b*, and whether any further decision making was involved which may have altered the receiver's action.

As described previously, the receiver's action may be fed back into the DLNN module in order to recalibrate a derived urgency and/or priority of the caller's call (e.g., to be used as further training for the machine learning model) given a similar contextual situation and/or urgency, in correlation with any pending tasks.

If, at 204, the automated urgency detection program 110*a*, 110*b* determined that the incoming call (i.e., the call) is not urgent, then at 208, a receiver of the call is enabled to delay the incoming call. As described previously with respect to step 206 above, the receiver of the call may be enabled to respond to the incoming call by ignoring, answering, delaying, and or sending a responsive text message to the caller. The receiver's response may be fed back into the DLNN module in order to recalibrate a derived urgency and/or priority of the caller's call (e.g., to be used as further training for the machine learning model).

It may be appreciated that FIG. 2 provide only an illustration of one embodiment and do not imply any limitations with regard to how different embodiments may be implemented. Many modifications to the depicted embodiment(s) may be made based on design and implementation requirements.

Figure 3:
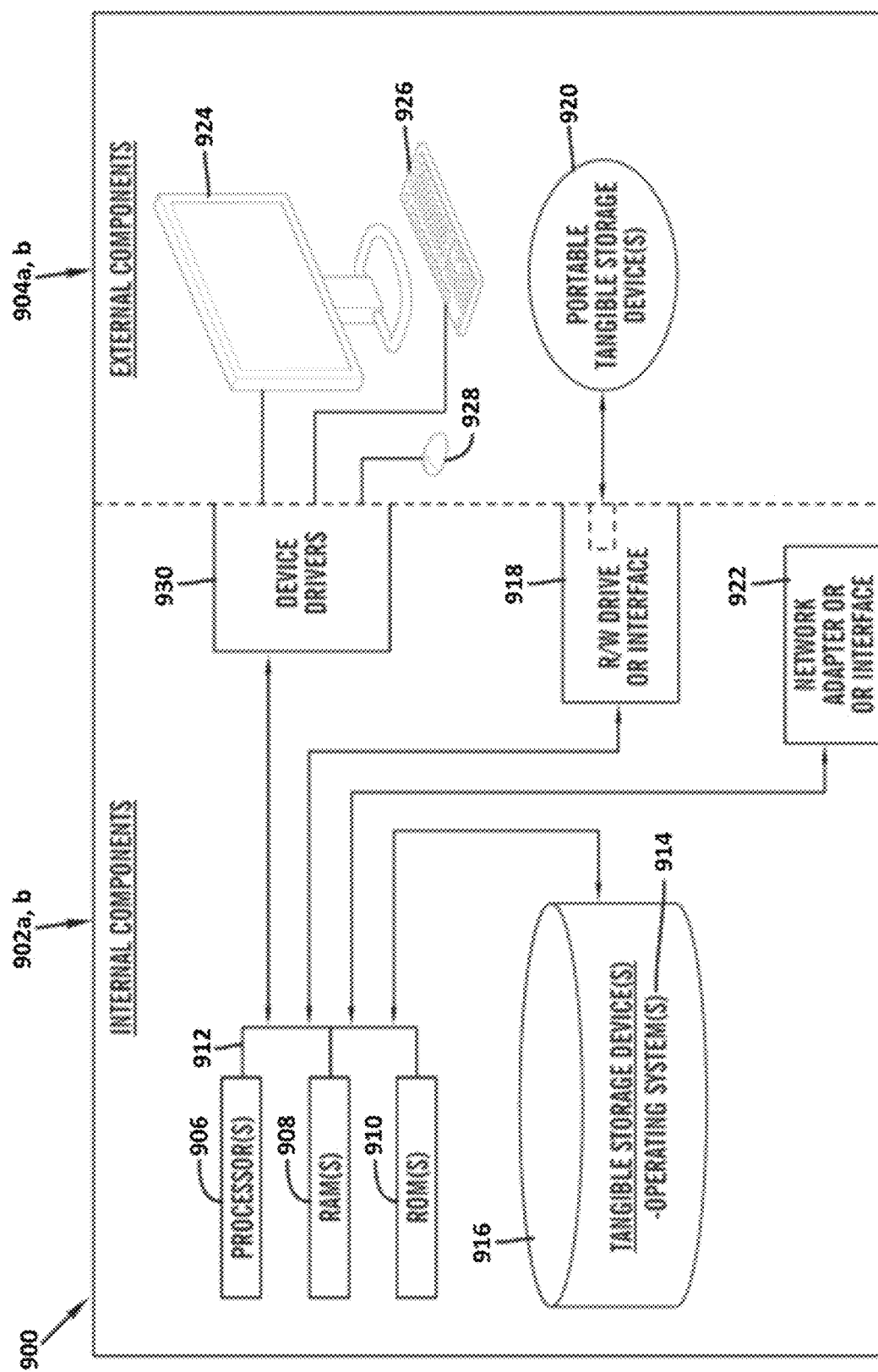
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the automated urgency detection program 110a in client computer 102, and the automated urgency detection program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the automated urgency detection program 110a and 110b can be stored on one or more of the respective portable computer-readable tangible storage devices 920, read via the respective RAY drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the automated urgency detection program 110a in client computer 102 and the automated urgency detection program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the automated urgency detection program 110a in client computer 102 and the automated urgency detection program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices.

Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
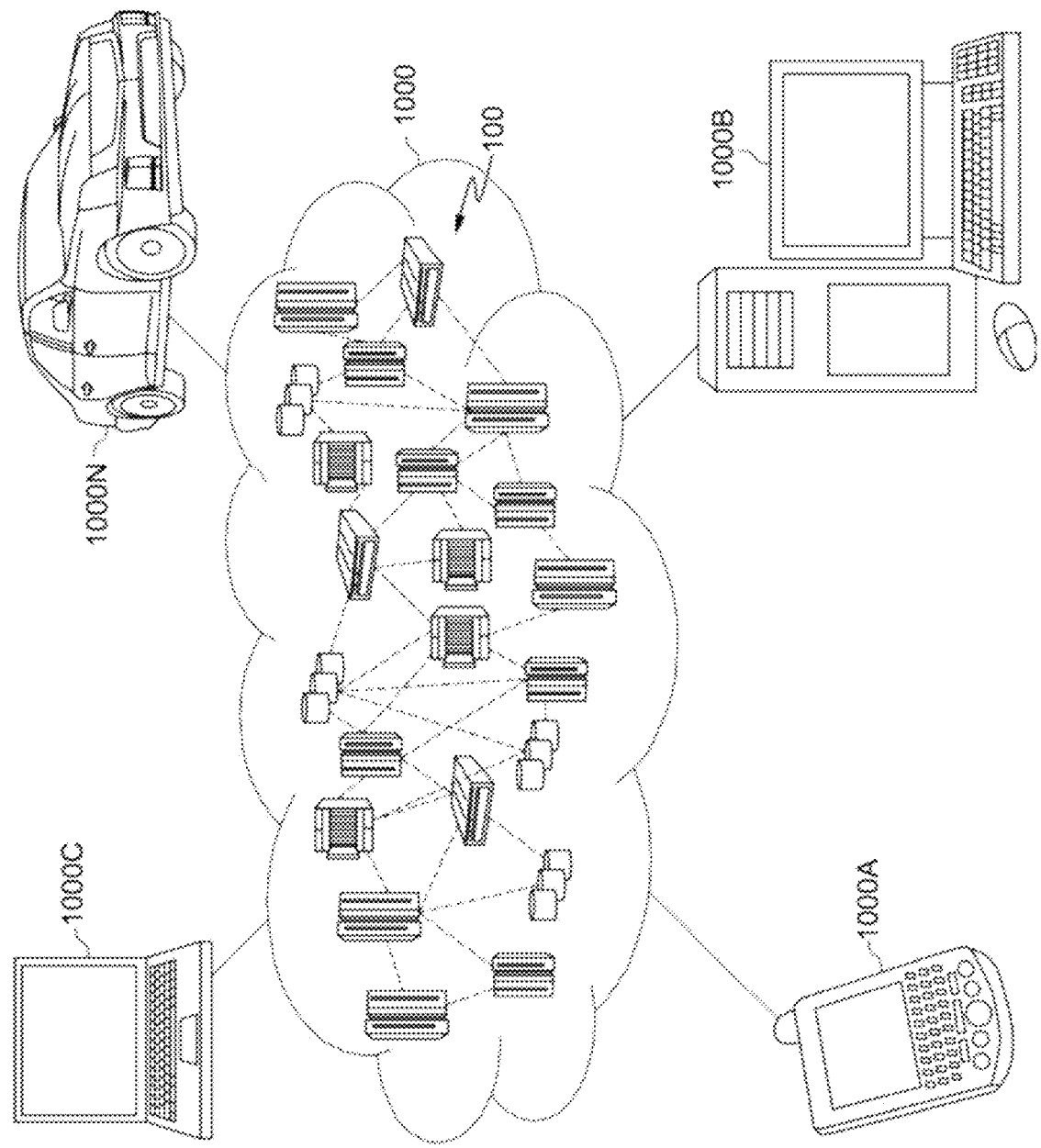
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
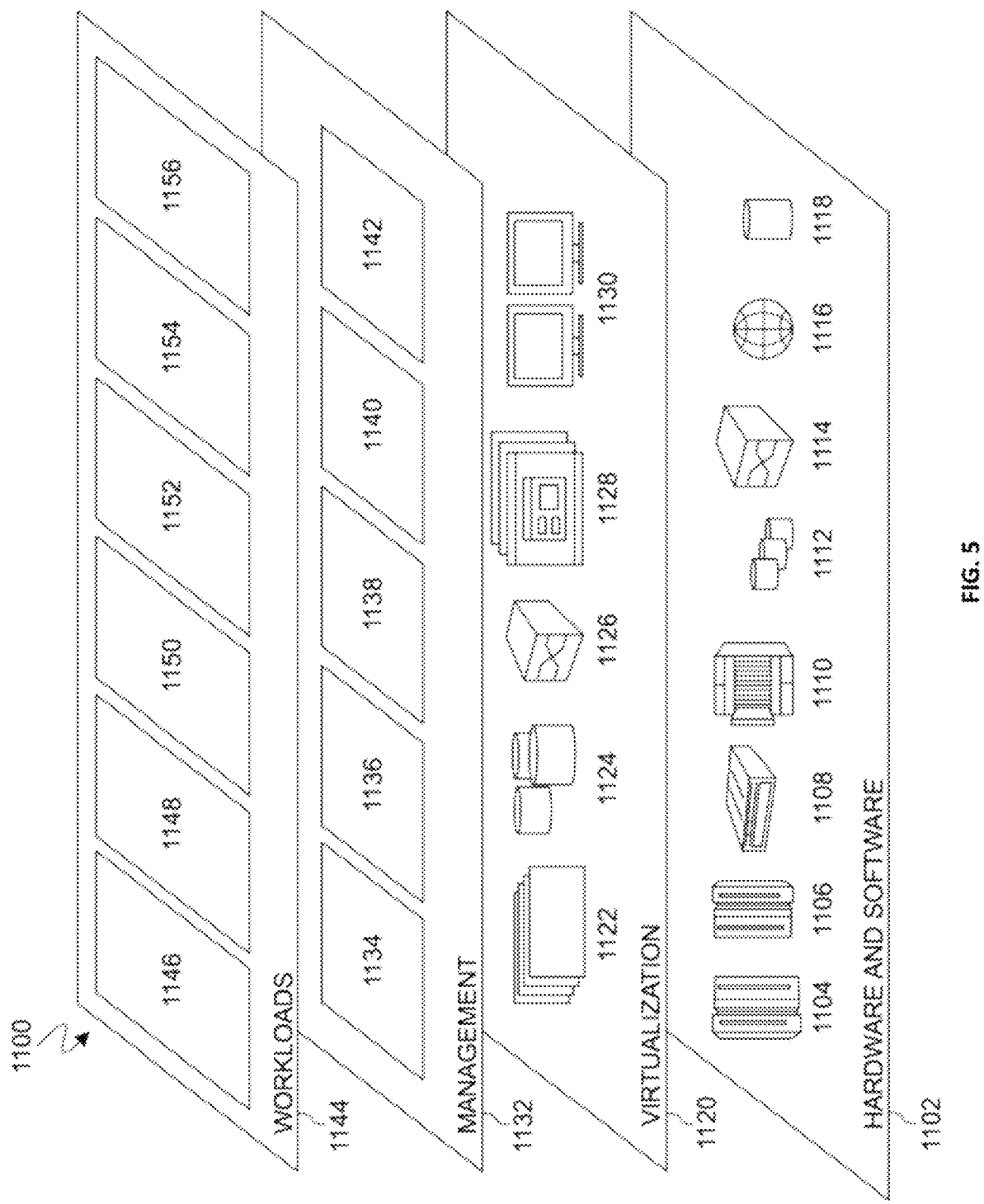
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and automated urgency detection 1156. An automated urgency detection program 110a, 110b provides a way to automatically derive and indicate an urgency and/or an importance of a caller's call (i.e., an incoming call) so that a receiver of the call may take appropriate action and efficiently handle the incoming call.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automated urgency detection, the method comprising:

capturing at least one caller parameter;

determining, based on the at least one caller parameter, whether an incoming call is urgent, wherein an urgency of the incoming call is categorized based on a predefined severity given varying risk thresholds, and wherein a Bi-long short term memory (LSTM) machine learning model is merged with a recurrent convolutional neural network (R-CNN) to form a machine learning module which utilizes multi-variate time series data and converts the multi-variate time series data into numerical feature vectors by encoding, to determine a context of the incoming call and make said determination on urgency;
conveying the determined urgency to a receiver of the incoming call.

2. The method of claim 1, wherein capturing the at least one caller parameter further comprises:
utilizing at least one connected Internet of Things (IOT) enabled device; and
storing the at least one caller parameter in a connected database.

3. The method of claim 1, wherein the caller parameter is selected from the group consisting of a vital parameter, a plurality of raw speech stream data, and a geographic location.

4. The method of claim 1, further comprising:
identifying a topic of the incoming call using contextual analysis via latent Dirichlet allocation (LDA).

5. The method of claim 1, wherein determining whether the incoming call is urgent further comprises:
identifying an aberration between the at least one captured caller parameter and a past caller parameter using a Deep Learning Neural Network (DLNN) model.

6. The method of claim 1, wherein the multi-variate time series data includes the at least one caller parameter.

7. The method of claim 1, wherein conveying the determined urgency to the receiver of the incoming call further comprises:
enabling the receiver to delay the incoming call; and
feeding an action by the receiver back into the machine learning model.

8. A computer system for automated urgency detection, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
capturing at least one caller parameter;
determining, based on the at least one caller parameter, whether an incoming call is urgent, wherein an urgency of the incoming call is categorized based on a predefined severity given varying risk thresholds, and wherein a Bi-long short term memory (LSTM) machine learning model is merged with a recurrent convolutional neural network (R-CNN) to form a machine learning module which utilizes multi-variate time series data and converts the multi-variate time series data into numerical feature vectors by encoding, to determine a context of the incoming call and make said determination on urgency;
conveying the determined urgency to a receiver of the incoming call.

9. The computer system of claim 8, wherein capturing the at least one caller parameter further comprises:
utilizing at least one connected Internet of Things (IOT) enabled device; and
storing the at least one caller parameter in a connected database.

10. The computer system of claim 8, wherein the caller parameter is selected from the group consisting of a vital parameter, a plurality of raw speech stream data, and a geographic location.

11. The computer system of claim 8, further comprising:
identifying a topic of the incoming call using contextual analysis via latent Dirichlet allocation (LDA).

12. The computer system of claim 8, wherein determining whether the incoming call is urgent further comprises:
identifying an aberration between the at least one captured caller parameter and a past caller parameter using a Deep Learning Neural Network (DLNN) model.

13. The computer system of claim 8, wherein the multi-variate time series data includes the at least one caller parameter.

14. The computer system of claim 8, wherein conveying the determined urgency to the receiver of the incoming call further comprises:
enabling the receiver to delay the incoming call; and
feeding an action by the receiver back into the machine learning model.

15. A computer program product for automated urgency detection, comprising:
one or more non-transitory computer-readable storage media and program instructions stored on at least one of the one or more tangible storage media, the program instructions executable by a processor to cause the processor to perform a method comprising:
capturing at least one caller parameter;
determining, based on the at least one caller parameter, whether an incoming call is urgent, wherein an urgency of the incoming call is categorized based on a predefined severity given varying risk thresholds, and wherein a Bi-long short term memory (LSTM) machine learning model is merged with a recurrent convolutional neural network (R-CNN) to form a machine learning module which utilizes multi-variate time series data and converts the multi-variate time series data into numerical feature vectors by encoding, to determine a context of the incoming call and make said determination on urgency;
conveying the determined urgency to a receiver of the incoming call.

16. The computer program product of claim 15, wherein capturing the at least one caller parameter further comprises:
utilizing at least one connected Internet of Things (IOT) enabled device; and
storing the at least one caller parameter in a connected database.

17. The computer program product of claim 15, wherein the caller parameter is selected from the group consisting of a vital parameter, a plurality of raw speech stream data, and a geographic location.

18. The computer program product of claim 15, further comprising:
identifying a topic of the incoming call using contextual analysis via latent Dirichlet allocation (LDA).

19. The computer program product of claim 15, wherein determining whether the incoming call is urgent further comprises:
identifying an aberration between the at least one captured caller parameter and a past caller parameter using a Deep Learning Neural Network (DLNN) model.

20. The computer program product of claim 15, wherein the multi-variate time series data includes the at least one caller parameter.

* * * * *